United States Patent [19]
Weder et al.

[11] Patent Number: 5,007,229
[45] Date of Patent: Apr. 16, 1991

[54] METHOD OF WRAPPING UTILIZING A SELF ADHERING WRAPPING MATERIAL

[75] Inventors: Donald E. Weder, Highland; William F. Straeter, Breese; Joseph G. Straeter, Highland, all of Ill.; Franklin J. Craig, Valley Park, Mo.; Wilma M. Donnelly, Highland, Ill.; Jack W. Redditt, Nashville, Tenn.

[73] Assignee: Highland Supply Corporation, Highland, Ill.

[21] Appl. No.: 368,597

[22] Filed: Jun. 20, 1989

Related U.S. Application Data

[63] Continuation-in-part of Ser. No. 249,761, Sep. 26, 1988, which is a continuation-in-part of Ser. No. 219,083, Jul. 13, 1988, Pat No. 4,897,031, which is a continuation of Ser. No. 613,080, May 22, 1984, abandoned, which is a continuation-in-part of Ser. No. 235,541, Aug. 11, 1988, Pat No. 4,835,834, which is a continuation of Ser. No. 876,405, Jun. 20, 1986.

[51] Int. Cl.⁵ .................... B65B 11/56; B65B 11/48
[52] U.S. Cl. ............................. 53/397; 53/461; 53/462; 53/465
[58] Field of Search ............ 53/461, 462, 465, 466, 53/397, 414, 416; 229/87.06, 87.19, 87.01

[56] References Cited

U.S. PATENT DOCUMENTS

| | | |
|---|---|---|
| 239,987 | 4/1881 | Shellenberger . |
| 716,668 | 12/1902 | Cheney . |
| 732,889 | 7/1903 | Paver . |
| 923,663 | 6/1909 | Kroeger . |
| 1,002,346 | 9/1911 | Weeks . |
| 1,052,379 | 2/1913 | Ranken . |

(List continued on next page.)

FOREIGN PATENT DOCUMENTS

| | | |
|---|---|---|
| 163,453 | 12/1985 | EPO . |
| 2,036,163 | 12/1970 | France . |
| 2,272,914 | 12/1975 | France . |
| 2,489,126 | 3/1982 | France . |
| 1,204,647 | 9/1970 | Great Britain . |
| 8,101,464 | 10/1982 | Netherlands . |
| 161,005 | 4/1983 | Switzerland . |
| 274,167 | 3/1951 | Switzerland . |
| 560,532 | 4/1972 | Switzerland . |
| 28,130 | 9/1907 | United Kingdom . |
| 2,948,265 | 5/1981 | West Germany . |

OTHER PUBLICATIONS

Exhibit A. Curtis Wagner Co., Inc., Houston, TX, shows thick, stiff shiny red plastic pot cover with large scalloped border. (Photograph) Date unknown.
Exhibit B. Jacobson Pot Cover Company of Scranton, (List continued on next page.)

Primary Examiner—Horace M. Culver
Attorney, Agent, or Firm—Dunlap, Codding, Peterson & Lee

[57] ABSTRACT

A wrapping material comprising a sheet of material such as paper, cellophane, foil, or man-made organic polymer film and a cling material such as polyethylene secured to a portion of the sheet of material. The cling material connects to the sheet of material and/or itself as the wrapping material is wrapped about an item thereby securing the sheet of material about the item. A method of wrapping an item such as a floral arrangement, Easter basket or a gift container by wrapping the item with the wrapping material.

56 Claims, 2 Drawing Sheets

U.S. PATENT DOCUMENTS

| | | | |
|---|---|---|---|
| 1,069,675 | 8/1913 | Claussen . | |
| 1,206,708 | 11/1916 | Hutchins . | |
| 1,421,027 | 6/1922 | Reynolds . | |
| 1,421,628 | 7/1922 | Watkins . | |
| 1,446,563 | 2/1923 | Hughes . | |
| 1,693,435 | 11/1928 | Clarke . | |
| 1,743,903 | 1/1930 | Reece | 229/87.06 X |
| 1,760,820 | 5/1930 | Drew | 229/87.01 X |
| 1,863,216 | 6/1932 | Wordingham . | |
| 1,868,853 | 7/1932 | Sievers . | |
| 1,920,533 | 8/1933 | Strauss | 229/87.06 X |
| 1,920,533 | 8/1933 | Strauss | 281/34 |
| 1,924,926 | 8/1933 | Gray | 65/53 |
| 1,951,642 | 3/1934 | Augustin, et al. | 47/34 |
| 1,978,631 | 10/1934 | Herrlinger | 91/68 |
| 1,979,771 | 11/1934 | Potter | 47/41 |
| 2,047,980 | 7/1936 | Olm et al. | 229/87.06 X |
| 2,076,212 | 4/1937 | Suter, et al. | 91/67.9 |
| 2,123,075 | 7/1938 | Langa | 47/34 |
| 2,152,648 | 4/1939 | Jones | 47/34 |
| 2,278,673 | 4/1942 | Savada, et al. | 154/43 |
| 2,302,259 | 11/1942 | Rothfuss | 41/10 |
| 2,355,559 | 8/1944 | Renner | 229/8 |
| 2,411,328 | 11/1946 | Macnab | 33/12 |
| 2,482,981 | 9/1949 | Kamrass | 41/13 |
| 2,510,120 | 6/1950 | Leander | 117/122 |
| 2,529,060 | 11/1950 | Trillich | 177/68.5 |
| 2,774,187 | 12/1956 | Smithers | 47/41 |
| 2,822,287 | 2/1958 | Avery | 117/14 |
| 2,827,217 | 3/1958 | Clement | 229/1.5 |
| 2,845,735 | 8/1958 | Werner | 41/10 |
| 2,942,823 | 6/1960 | Chapman | 248/97 |
| 2,967,652 | 1/1961 | Canfield | 229/5.5 |
| 3,013,689 | 12/1961 | Shropshire | 215/100.5 |
| 3,022,605 | 2/1962 | Reynolds | 47/58 |
| 3,094,810 | 6/1963 | Kalpin | 47/37 |
| 3,130,113 | 4/1964 | Silman | 161/97 |
| 3,271,922 | 9/1966 | Wallerstein, et al. | 53/3 |
| 3,273,301 | 9/1966 | Anderson | 53/465 |
| 3,376,666 | 4/1968 | Leonard | 47/11 |
| 3,488,022 | 1/1970 | Vittori | 248/152 |
| 3,552,059 | 1/1971 | Moore | 47/41.12 |
| 3,554,434 | 1/1971 | Anderson | 229/55 |
| 3,620,366 | 11/1971 | Parkinson | 206/59C |
| 3,628,721 | 12/1971 | Palmer | 229/87.01 X |
| 3,681,105 | 8/1972 | Milutin, et al. | 117/15 |
| 3,775,903 | 12/1973 | Pike | 47/37 |
| 3,869,828 | 3/1975 | Matsumoto | 47/34.11 |
| 3,962,503 | 6/1976 | Crawford | 428/40 |
| 3,974,960 | 8/1976 | Mitchell | 229/62 |
| 4,043,077 | 8/1977 | Stonehocker | 47/66 |
| 4,054,697 | 10/1977 | Reed, et al. | 428/40 |
| 4,118,890 | 10/1978 | Shore | 47/28R |
| 4,170,618 | 10/1979 | Adams | 264/101 |
| 254,659 | 4/1980 | Karotseris | D11/143 |
| 4,216,239 | 8/1980 | Weder, et al. | 47/72 |
| 4,250,664 | 2/1981 | Remke | 47/76 |
| 4,283,032 | 8/1981 | Smith | 248/97 |
| 4,297,811 | 11/1981 | Weder | 47/72 |
| 4,300,312 | 11/1981 | Weder, et al. | 47/72 |
| 4,338,979 | 7/1982 | Dow | 141/10 |
| 4,340,146 | 7/1982 | Stratton | 215/100.5 |
| 4,380,564 | 4/1983 | Cancio, et al. | 428/167 |
| 4,400,910 | 8/1983 | Koudstaal, et al. | 47/84 |
| 4,413,725 | 11/1983 | Bruno, et al. | 206/45.33 |
| 4,488,697 | 12/1984 | Garvey | 248/101 |
| 4,508,223 | 4/1985 | Catrambone | 206/423 |
| 4,621,733 | 11/1986 | Harris | 206/423 |
| 4,697,732 | 10/1987 | Altus | 229/87.06 |
| 292,562 | 11/1987 | Weder, et al. | D11/164 |
| 292,563 | 11/1987 | Weder, et al. | D11/164 |
| 293,224 | 12/1987 | Weder, et al. | D11/164 |
| 4,717,262 | 1/1988 | Roen, et al. | 383/120 |
| 293,774 | 1/1988 | Weder, et al. | D11/164 |
| 293,775 | 1/1988 | Weder, et al. | D11/164 |
| 4,733,521 | 3/1988 | Weder, et al. | 53/580 |
| 4,773,182 | 9/1988 | Weder, et al. | 47/72 |
| 4,795,601 | 1/1989 | Cheng | 264/138 |
| 4,835,834 | 6/1989 | Weder, et al. | 29/525 |
| 4,876,841 | 10/1989 | Jensen | 53/461 X |

OTHER PUBLICATIONS

Pennsylvania advertising literature. Date of first use unknown.

Exhibit C. Photograph of pot cover, manufacturer unknown, but very similar to #C21 on Exhibit B (Jacobson literature).

Exhibt D. Photocopy of photo of pot cover ("Platform Pot Dresser") made by John Raisen Corp., San Francisco, CA. Date of first use unknown.

Exhibit E. Photograph of 2-part pot cover system made by Floral Decor, subsidiary of John Henry Co., Lansing MI.

Exhibit F. Photo of pot cover made by a Holland company (K.P.I.). Date of first public use believed to be late 1984.

Exhibit G. "The Glass of Frederick Carder", copyright 1971 by P.V. Gardner, showing various styles of glass basket-like vases or containers.

Exhibit H. "Speed Cover " brochure, published in 1983 by Applicants, showing various pot covers for sale.

Exhibit I. "Speed Cover " brochure, published in 1983 by Applicants, showing various pot covers for sale.

Exhibit J. Item published in 1936 by Gellman Bros., Minneapolis, MN. Shows an assortment of paper hats.

Exhibit K. Photo of various other flower pot wrappings, sold in rolls or sheets and used in the floral industry for years.

Exhibit L. Photo of pot cover made of woven straw-like material.

Exhibit M. Photo of basket-type pot cover used in the floral industry.

Exhibit N. "Speed Cover " brochure, published in 1984 by Applicants, showing various pot covers for sale.

It is also known to shape a sheet of shape-sustaining wrapping material, such as foil, to a pot using a board with a central hole, the diameter being greater than the diameter of the pot, by pushing the pot through the hole pulling the wrapping through the hole so that the wrapping is gathered around the pot.

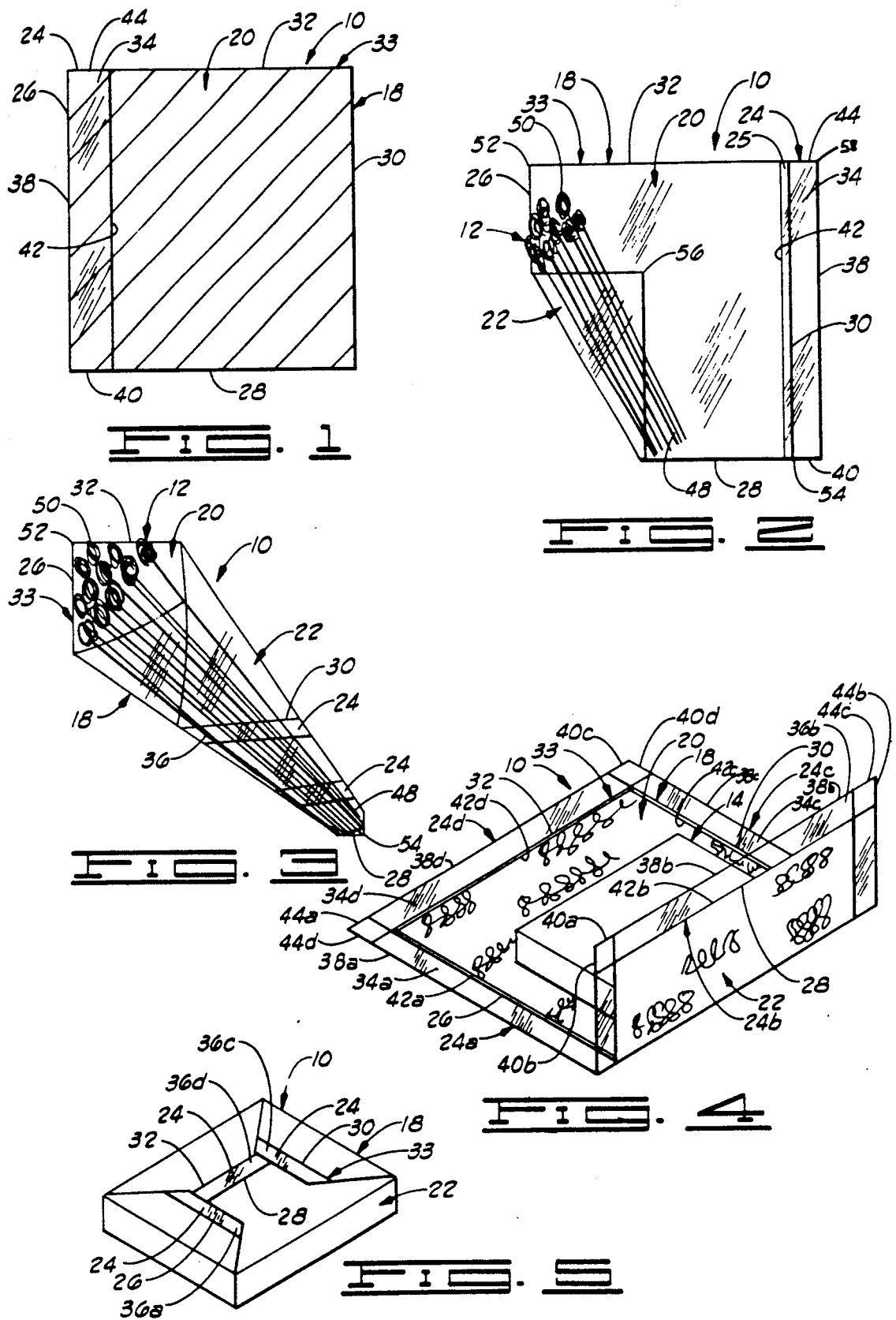

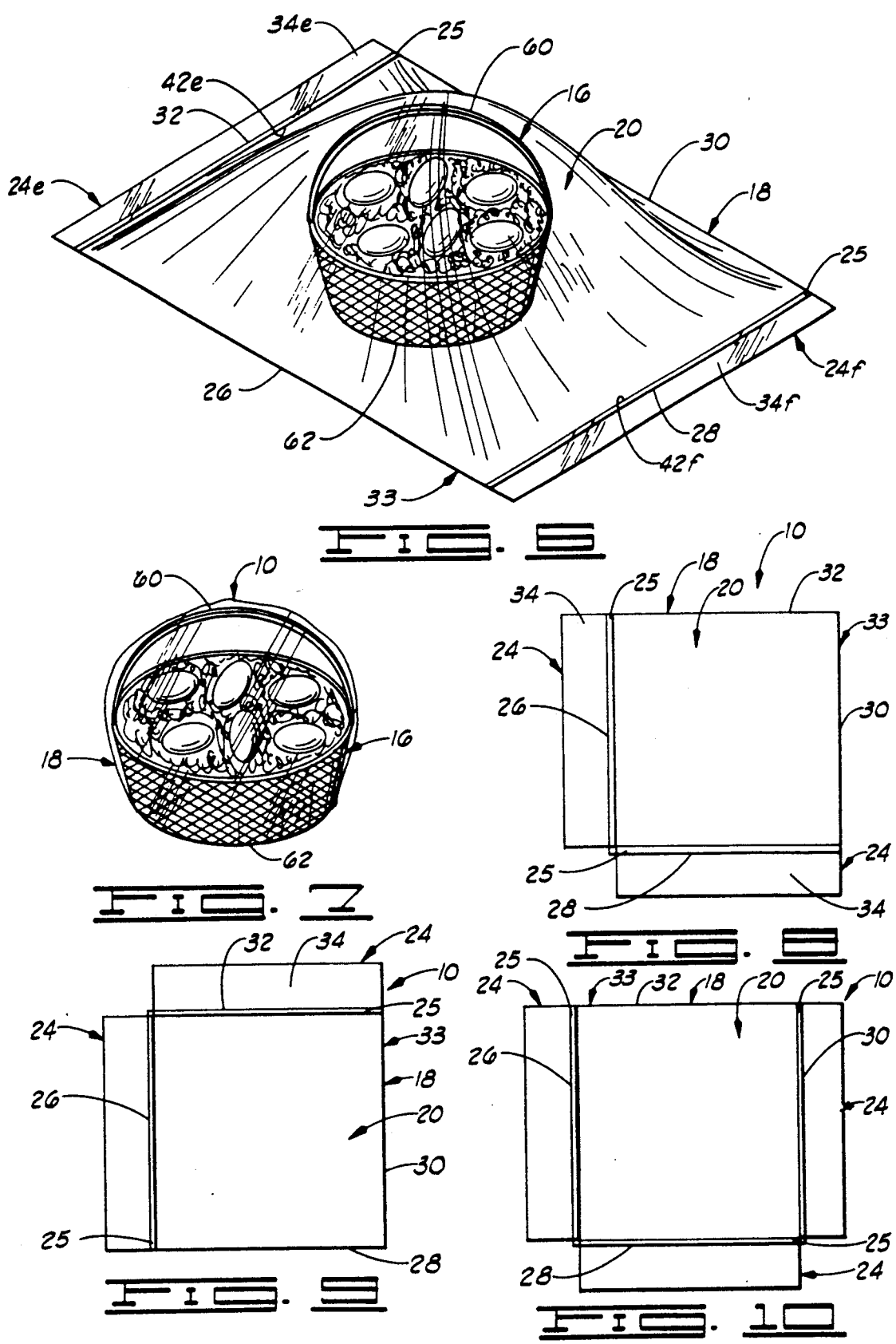

METHOD OF WRAPPING UTILIZING A SELF ADHERING WRAPPING MATERIAL

CROSS REFERENCE TO RELATED APPLICATIONS

This application is a continuation-in-part of U.S. Ser. No. 249,761, filed Sept. 26, 1988, entitled Method and Apparatus For Covering Portions Of An Object With a Sheet Of Material Having a Pressure Sensitive Adhesive Coating Applied To At Least a Portion Of At Least One Surface Of The Sheet Of Material which is a continuation-in-part of Ser. No. 219,083, filed July 13, 1988, entitled Article Forming System, and now U.S. Pat. No. 4,897,031, which is a continuation of U.S. Ser. No. 004,275, filed Jan. 5, 1987, entitled Article Forming System, now U.S. Pat. No. 4,773,182 which is a continuation of U.S. Ser. No. 613,080, filed May 22, 1984, entitled Article Forming System, now abandoned, and a continuation-in-part of co-pending application entitled Flower Pot Accessory filed about Aug. 11, 1988, U.S. Ser. No. 232,541, and now U.S. Pat. No. 4,835,834, which is a continuation of U.S. Ser. No. 876,405, filed June 20, 1986, entitled Flower Pot Accessory, now abandoned.

Application U.S. Ser. Nos. 249,761, 219,083, 004,275 (U.S. Pat. No. 4,773,182), and Application U.S. Ser. No. 232541, described above, is hereby incorporated by reference.

Field of the Invention

The present invention generally relates to wrapping material utilized in wrapping items such as floral arrangements and containers and methods of using same.

SUMMARY OF THE INVENTION

The present invention comprises a wrapping material for wrapping about at least a portion of an item, comprising a sheet of material having an upper surface and a lower surface sufficiently sized to wrap at least a portion of the item; and a cling material secured to a portion of the sheet of material. The cling material is capable of connecting to the sheet of material and itself upon contacting engagement. The sheet of material with the cling material connected thereto is wrappable about the item whereby portions of the cling material contactingly engage and connect to other portions of the wrapping material for generally securing the sheet of material wrapped about at least a portion of the item.

In accordance with the method of the present invention, a wrapping material as described heretofore is wrapped about an item by disposing the sheet of material about the item so that portions of the cling material contactingly engage and connect to portions of the wrapping material for generally securing the sheet of material about at least a portion of the item.

BRIEF DESCRIPTION OF THE DRAWINGS

FIG. 1 is a top plan view of a wrapping material constructed in accordance with the present invention.

FIG. 2 is a top plan view of a wrapping material constructed in accordance with the present invention and diagrammatically showing a floral arrangement thereon.

FIG. 3 is a partial perspective view of the floral arrangement wrapped in the wrapping material shown in FIG. 2.

FIG. 4 is a partial perspective view of a wrapping material constructed in accordance with the present invention and showing a container thereon.

FIG. 5 is the container wrapped in the wrapping material shown in FIG. 4.

FIG. 6 is a partial perspective view of a wrapping material constructed in accordance with the present invention and diagrammatically showing an Easter basket.

FIG. 7 is the Easter basket wrapped in the wrapping material shown in FIG. 6.

FIG. 8 is a top plan view of another embodiment of the wrapping material of the present invention.

FIG. 9 is a top plan view of another embodiment of the wrapping material of the present invention.

FIG. 10 is a top plan view of another embodiment of the wrapping material of the present invention.

DESCRIPTION OF THE PREFERRED EMBODIMENTS

Referring to FIG. 1, shown therein and designated generally by the reference numeral 10 is a wrapping material which is constructed in accordance with the present invention for wrapping at least a portion of an item. The wrapping material 10 may be utilized to wrap any item in accordance with the present invention. Preferably, the item is a floral arrangement, one such arrangement being shown in FIGS. 2 and 3 and generally designated by the numeral 12; or a container enclosing a gift item, one such container being shown in FIGS. 4 and 5 and generally designated by the numeral 14; or an Easter basket, one such basket being shown in FIGS. 6 and 7 and generally designated by the numeral 16. "Floral arrangement" as used herein means cut fresh flowers, artificial flowers, other fresh and/or artificial plants or other floral materials and may include other secondary plants and/or ornamentation which add to the aesthetics of the overall floral arrangement.

Referring to FIG. 2, the wrapping material comprises a sheet of material 18 having an upper surface 20 and a lower surface 22. The sheet of material 18 is sized sufficiently to wrap at least a portion of the item, and preferably the entire item. The sheet of material 18 may be any shape, but preferably is square or rectangular.

The sheet of material 18 may be constructed from any suitable material that is capable of being wrapped about an item. Preferably, the sheet of material 18 comprises cloth, paper (untreated or treated in any manner), cellophane, foil, man-made organic polymer film or combinations thereof.

In one preferred embodiment, the sheet of material 18 is constructed from a relatively thin film of a substantially non-shape sustaining processed organic polymer film. The term "processed organic polymer film" as used herein means a man-made resin such as a polypropylene as opposed to naturally occurring resins such as cellophane.

A processed organic polymer film is relatively strong and not as subject to tearing (substantially non-tearable), as might be the case with paper or foil. The processed organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral arrangement.

Additionally a relatively thin film of substantially linearly linked processed organic polymer does not substantially deteriorate in sunlight. Processed organic polymer films having carbon atoms, both linearly linked and cross linked, and some cross linked polymer films, also may be suitable for use in the present invention provided such films are substantially flexible and can be made in a sheet-like format for wrapping purposes of the present invention.

A decorative pattern, such as a color and/or an embossed pattern, and/or other decorative surface ornamentation may be applied to the upper surface 20 and/or lower surface 22 of the sheet of material 18 or portions thereof. The sheet of material 18 also may be totally or partially clear or tinted transparent material.

The sheet of material 18 may be constructed of a single sheet of material or a plurality of sheets. Any thickness of the sheet of material 18 may be utilized in accordance with the present invention as long as the sheet of material 18 is wrappable about at least a portion of the item and the cling material is capable of securing same, as described herein. Typically the sheet of material has a thickness in a range of less than about 0.2 mils to about 10 mils. In a preferred embodiment, the sheet of material 18 is constructed from one transparent sheet of man-made organic polymer film having a thickness in a range of from less than about 0.5 mils to about 2.5 mils.

Referring to FIGS. 1, 2, 4 and 6, the wrapping material also comprises a cling material generally designated by the numeral 24 which is secured to the sheet of material 18. The cling material 24 may be secured to the sheet of material 18 at any position on the sheet of material 18 which permits the engagement of the cling material 24 with the sheet of material 18 and/or itself as described herein. Any manner of securing the cling material 24 to the sheet of material 18 may be utilized which permits the cling material 24 to remain securely fastened to the sheet of material 18 during and after the wrapping process described hereafter. Preferably a portion of the cling material 24 is heat sealed to the sheet of material 18 although adhesives also may be utilized. Examples of the heat seal 25 are shown in FIGS. 2, 6, 8, 9 and 10.

The cling material 24 may be any material which is capable of connecting to the sheet of material 18 and/or itself upon contacting engagement during the wrapping process and is wrappable about an item whereby portions of the cling material 24 contactingly engage and connect to other portions of the wrapping material 10 for generally securing the sheet of material 18 wrapped about at least a portion of the item. This connecting engagement is preferably temporary in that the wrapping material 10 may be easily removed without tearing same, i.e., the cling material "clings" to the wrapping material 10. However, the present invention also contemplates a wrapping material which remains securely connected to and about the wrapped item until the wrapping material is torn therefrom.

Preferably the cling material 24 is constructed and treated if necessary, from polyethylene such as Cling Wrap made by Glad ®, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. Generally, the cling material will range in thickness from less than about 0.2 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as previously described.

Any shape or amount of cling material 24 may be utilized with the present invention which permits the wrapping material 10 to be secured about the item. The entire surface of the sheet of material 10 may be covered with the cling material 24. Preferably a strip of sheet-like cling material is secured to one side of the sheet of material 18. The entire cling material 24 may be placed over a portion of the sheet of material 18 (FIG. 1) and secured thereto or preferably only a portion of the cling material 24 may overlap the sheet of material 18 (FIG. 2) for securing purposes so that substantial portions of both sides of the cling material 24 will be available for contacting the wrapping material.

Referring to one preferred embodiment shown in FIG. 2, the sheet of material 18 comprises the upper surface 20 and the lower surface 22. The sheet of material 18 further comprise a first side 26, a second side 28, a third side 30 and a fourth side 32 defining an outer peripheral surface 33. The cling material 24 comprises an upper surface 34 and a lower surface 36. The cling material 24 further comprises a first side 38, a second side 40, a third side 42 and a fourth side 44. The third side 42 of the cling material 24 is heat sealed to the third side 30 of the sheet of material 18 so that a substantial portion of the cling material 24 is not contacted by the sheet of material 18.

A plurality of cling materials may be secured to the sheet of material as shown in FIGS. 4, 6, 8, 9 and 10. Referring to FIG. 4, the third sides 42a, 42b, 42c and 42d of the cling materials 24a, 24b, 24c and 24d are secured to the first side 26, second side 28, third side 30 and fourth side 32 respectively of the sheet of material 18. The terminal ends of the cling materials are also secured to each other. Referring to FIG. 6, the third sides 42e and 42f of cling materials 24e and 24f are secured to the second side 28 and the fourth side 32 respectively of the sheet of material 18. As shown in FIGS. 4, 5 and 6, only a portion of the third side 42a, 42b, 42c, 42d, 42e and 42f of the cling material 24a, 24b, 24c, 24d, 24e, and 24f contacts the sheet of material 18 so that substantially both upper 34a, 34b (not shown), 34c, 34d, 34e and 34f and lower 36a, 36b, 36c, 36d, 36e (not shown) and 36f (not shown) surface of the cling material 24a, 24b, 24c, 24d, 24e and 24f are capable of connecting to the wrapping material 10. Other embodiments (e.g., FIGS. 8-10) may have a plurality of cling materials 24 secured in the same or different manner on any combination of sides of the sheet of material 18 or on any portion of the sheet of material 18.

In wrapping the item, the item may be placed on the sheet of material 18, preferably the upper surface 20. The wrapping material 10 also may be placed over the item to be wrapped. Portions of the wrapping material 10 are then positioned about a portion of the item to be wrapped so that the cling material 24 connects either to itself or the sheet of material 18 upon wrapping and thereby secures the sheet of material 18 about the item. Depending upon the item to be wrapped, the wrapping material 10 either covers the entire item such as a gift or a gift container or selected portions of the item, such as a floral arrangement.

In a preferred embodiment shown in FIGS. 2 and 3, a floral arrangement 12 of freshly cut flowers having a stem portion 48 and a growing portion 50 such as petals is positioned on the upper surface 20 of the sheet of material 18. The growing portion 50 is positioned near the fourth side 32 of the sheet of material 26 preferably near the corner 52 between the first 26 and fourth 32 sides, and the stem portion 48 is positioned near the second side 28 of the sheet of material 18 preferably pointing towards the corner 54 between the second 28 and third 30 sides. A corner 56 between the first 26 and second 28 sides of the sheet of material 18 is positioned over the stem portion 48 of the floral arrangement 12. The floral arrangement 12 is then wrapped with the remaining wrapping material 10. Preferably the floral arrangement 12 with the corner 56 of the sheet of material 18 is rolled towards a corner 58 between the third 30 and fourth 32 sides. This diagonal positioning of the floral arrangement 12 on the sheet (growing portion and stem portion pointing towards opposite diagonal corners) and subsequent wrapping permits the stem portion 48 of the floral arrangement 12 to be wrapped by the wrapping material 10 while permitting the growing portion 50 (the petals) to remain substantially unwrapped and therefore undamaged by the wrapping process. In this embodiment, the sheet of material 18 is transparent man-made organic polymer film which is waterproof.

In another preferred embodiment (not shown), the growing portion 50 of the floral arrangement 12 is placed above the fourth side 32 of the sheet of material 18 and the stem portion 48 is positioned on the sheet of material 18 pointing towards the second side 28. The first side 26 is placed over that portion of the floral arrangement 12 positioned on the sheet of material 18. The floral arrangement 12 and the first side 26 are rolled towards the third side 30 to which is secured cling material 24.

The wrapping material 10 may be wrapped loosely or tightly and may form a cone-shaped wrap, a tube-shaped wrap or substantially conform to the shape of the item being wrapped.

Items such as Easter baskets may be wrapped with clear or tinted films in order to not only enhance the appearance of the item and allow the potential buyer to see the contents thereof, but also to retain the contents of the item. Referring to FIGS. 6 and 7, the wrapping material 10 comprising a transparent material is positioned over the Easter basket 16 comprising a top 60 and a bottom 62 and wrapped about the Easter basket 16 so that the cling material 24 clings about the bottom 62 thereof (not shown).

In another embodiment shown in FIGS. 4 and 5, a gift container 14, in this case a box, is positioned on the upper surface 20 of the sheet of material 18. The second side 28 of the sheet of material 18 is folded over the gift container 14 (although there being no preference as to which side is first folded over the gift container). The remaining sides are then folded about the gift container 66. In this embodiment, all four sides of the sheet of material 18 have cling material 24 secured thereto.

The present invention provides a quick and easy wrapping material without the need of tape or other additional adhesives. It can be waterproof and may also provide visual observation of the item wrapped.

Changes may be made in the embodiments of the invention described herein or in parts or elements of the embodiments described herein or in the steps or in the sequence of steps of the methods described herein without departing from the spirit and scope of the invention as defined in the following claims.

What is claimed is:

1. A method of wrapping at least a portion of an item, comprising:
providing a wrapping material comprising a sheet of material sufficiently sized to wrap at least a portion of the item, wherein the sheet of material comprises an upper surface and a lower surface; and a cling material secured to a portion of the sheet material, wherein the cling material is capable of connecting to the sheet of material and itself upon contacting engagement and wherein the sheet of material with the cling material connected thereto is wrappable about the item whereby portions of the cling material contactingly engage and connect to portions of the wrapping material for generally securing the sheet of material wrapped about at least a portion of the item; and
wrapping the item by disposing the sheet of material about the item so that portions of the cling material contactingly engage and connect to portions of the wrapping material for generally securing the sheet of material about at least a portion of the item.

2. The method of claim 1 wherein the item comprises a floral arrangement.

3. The method of claim 1 wherein the item comprises an Easter basket.

4. The method of claim 1 wherein the item comprises a gift container.

5. The method of claim 1 wherein the sheet of material is selected from a group consisting of cloth, paper, cellophane, foil, man-made organic polymer films or combinations thereof.

6. The method of claim 1 wherein the cling material comprises polyethylene.

7. The method of claim 1 wherein the sheet of material has an outer peripheral surface, and wherein the cling material is connected to a portion of the sheet of material so that at least a portion of the cling material extends beyond the outer peripheral surface of the sheet of material.

8. The method of claim 1 further comprising a plurality of cling materials each cling material having a portion connected to at least a portion of the sheet material.

9. The method of claim 1 wherein the sheet of material further comprises a first side, a second side, a third side and a fourth side.

10. The method of claim 9 further comprising a plurality of cling materials, each cling material having a portion connected to at least of portion of the sheet of material.

11. The method of claim 10 wherein one of the cling materials is secured to at least a portion of the first side of the sheet of material and one other cling material is secured to at least a portion of the second side of the sheet of material.

12. The method of claim 10 wherein one of the cling materials is secured to at least a portion of the first side of the sheet of material and one other cling material is secured to at least a portion of the third side of the sheet of material.

13. The method of claim 10 wherein one of the cling materials is secured to at least a portion of the first side of the sheet of material and one other cling material is secured to at least a portion of the fourth side of the sheet of material.

14. The method of claim 10 wherein one of the cling materials is secured to at least a portion of the first side of the sheet of material, one other cling material is secured to at least a portion of the second side of the sheet of material and at least a portion of the third side of the sheet of material.

15. The method of claim 10 wherein one of the cling materials is secured to at least a portion of the first side of the sheet of material, one other cling material is secured to at least a portion of the second side of the sheet of material, one other cling material is secured to at least a portion of the third side of the sheet of material and yet another cling material is secured to at least a portion of the fourth side of the sheet of material.

16. The method of claim 10 wherein one of the cling materials is secured to at least a portion of the second side of the sheet of material and one other cling material is secured to at least a portion of the fourth side of the sheet of material.

17. The method of claim 1 wherein the cling material comprises a thickness in a range of less than about 0.2 mils to about 10 mils.

18. The method of claim 1 wherein the cling material comprises a thickness in a range of less than about 0.6 mils to about 2 mils.

19. The method of claim 1 wherein the sheet of material comprises a thickness of a range of less than about 0.2 mils to about 10 mils.

20. The method of claim 1 wherein the sheet of material comprises a thickness in a range of less than about 0.5 mils to about 2.5 mils.

21. A method for wrapping at least a portion of a floral arrangement comprising at least one stem portion at one end and at least one growing portion at the opposite end, comprising:
providing a wrapping material comprising a sheet of material sufficiently sized to wrap at least a portion of the floral arrangement having an upper surface, a lower surface, a first side, a second side, a third side and a fourth side; and a cling material secured to a portion of the sheet of material
wherein the cling material is capable of connecting to the sheet of material and itself upon contacting engagement and wherein the sheet of material with the cling material connected thereto is wrappable about the floral arrangement whereby portions of the cling material contactingly engage and connect to other portions of the wrapping material for generally securing the sheet of material wrapped about at least a portion of the floral arrangement;
disposing the floral arrangement on the sheet of material such that the stem portion is near the second side of the sheet of material and the growing portion is near the fourth side of the sheet of material; and
positioning a portion of the first side of the sheet of material over at least a portion of the stem portion of the floral arrangement and wrapping at least a portion of the floral arrangement with the wrapping material such that entire sheet of material is wrapped about at least a portion of the floral arrangement whereby portions of the cling film contactingly engage and connect to other portions of the wrapping material for generally securing the sheet of material wrapped about at least a portion of the floral arrangement.

22. The method of claim 21 wherein the sheet of material is selected from a group consisting of cloth, paper, cellophane, foil, man-made organic polymer film or combinations thereof.

23. The method of claim 21 wherein the sheet of material has an outer peripheral surface, and wherein the cling material is connected to a portion of the sheet so that at least a portion of the cling material extends beyond the outer peripheral surface of the sheet of material.

24. The method of claim 21 wherein the cling material is secured to at least a portion of the third side of the sheet of material.

25. The method of claim 21 further comprising a plurality of cling materials, each cling material having a portion connected to a portion of the sheet of material.

26. The method of claim 25 wherein one of the cling materials is secured to at least a portion of the first side of the sheet of material, one other cling material is secured to at least a portion of the second side of the sheet of material, yet another cling material is secured to at least a portion of the third side of the sheet of material and yet another cling material is secured to at least a portion of the fourth side of the sheet of material.

27. The method of claim 25 wherein one of the cling materials is secured to at least a portion of the second side of the sheet of material and one other cling material is secured to at least a portion of the third side of the sheet of material.

28. The method of claim 25 wherein one of the cling materials is secured to at least a portion of the first side of the sheet of material and one other material is secured to at least a portion of the third side of the sheet of material.

29. The method of claim 25 wherein one of the cling materials is secured to at least a portion of the third side of the sheet of material and one other cling material is secured to the fourth side of the sheet of material.

30. The method of claim 21 wherein the cling material comprises a thickness in a range of less than about 0.2 mils to about 10 mils.

31. The method of claim 21 wherein the cling material comprises a thickness in a range of less than about 0.6 mils to about 2 mils.

32. The method of claim 21 wherein the sheet of material comprises a thickness of a range of less than about 0.2 mils to about 10 mils.

33. The method of claim 21 wherein the sheet of material comprises a thickness in a range of less than about 0.5 mils to about 2.5 mils.

34. A method of wrapping a gift container comprising:
providing a wrapping material comprising a sheet of material sufficiently sized to wrap at least a portion of the gift container wherein the sheet of material comprises an upper surface, a lower surface, a first side, a second side, a third side and a fourth side; and a cling material secured to a portion of the sheet of material
wherein the cling material is capable of connecting to the sheet of material and itself upon contacting engagement and wherein the sheet of material with the cling material connected thereto is wrappable about the gift container whereby portions of the cling material contactingly engage and connect to other portions of the wrapping material for generally securing the sheet of material wrapped about at least a portion of the gift container;

disposing the gift container on the sheet of material; and wrapping the gift container with the wrapping material such that the sheet of material is wrapped about the gift container whereby portions of the cling film contactingly engage and connect to other portions of the wrapping material for generally securing the sheet of material wrapped about the gift container.

35. The method of claim 34 wherein the sheet of material is selected from a group consisting of cloth, paper, cellophane, foil, man-made organic polymer film or combinations thereof.

36. The method of claim 34 wherein the sheet of material has an outer peripheral surface, and wherein the cling material is connected to a portion of the sheet so that at least a portion of the cling material extends beyond the outer peripheral surface of the sheet of material.

37. The method of claim 34 further comprising a plurality of cling materials, each cling material having a portion connected to a portion of the sheet of material.

38. The method of claim 37 wherein one of the cling materials is secured to at least a portion of the first side of the sheet of material and one other cling material is secured to at least a portion of the second side of the sheet of material.

39. The method of claim 37 wherein one of the cling materials is secured to at least a portion of the second side of the sheet of material and one other cling material is secured to at least a portion of the fourth side of the sheet of material.

40. The method of claim 37 wherein one of the cling materials is secured to at least a portion of the first side of the sheet of material, one other cling material is secured to at least a portion of the second side of the sheet of material, one other cling material is secured to at least a portion of the third side of the sheet of material and yet another cling material is secured to at least a portion of the fourth side of the sheet of material.

41. The method of claim 34 wherein the cling material comprises a thickness in a range of less than about 0.2 mils to about 10 mils.

42. The method of claim 34 wherein the cling material comprises a thickness in a range of less than about 0.6 mils to about 2 mils.

43. The method of claim 34 wherein the sheet of material comprises a thickness of a range of less than about 0.2 mils to about 10 mils.

44. The method of claim 34 wherein the sheet of material comprises a thickness in a range of less than about 0.5 mils to about 2.5 mils.

45. A method for wrapping at least a portion of an Easter basket comprising a top and a bottom, comprising:

providing a wrapping material comprising a sheet of material sufficiently sized to wrap at least a portion of the Easter basket, wherein the sheet of material comprises an upper surface, a lower surface, a first side, a second side, a third side and a fourth side; and a cling material secured to a portion of the sheet of material wherein the cling material is capable of connecting to the sheet of material and itself upon contacting engagement and wherein the sheet of material with the cling material connected thereto is wrappable about the Easter basket whereby portions of the cling material contactingly engage and connect to other portions of the wrapping material for generally securing the sheet of material wrapped about at least a portion of the Easter basket;

disposing the wrapping material over the top of the Easter basket; and positioning portions of the wrapping material about the Easter basket such that the sheet of material is wrapped about at least a portion of the Easter basket whereby portions of the cling film contactingly engage and connect to other portions of the wrapping material for generally securing the sheet of material wrapped about at least a portion of the floral arrangement.

46. The method of claim 45 wherein the sheet of material is selected from the group consisting of cloth, paper, cellophane, foil, man-made organic polymer film or combinations thereof.

47. The method of claim 45 wherein the sheet of material has an outer peripheral surface and wherein the cling material is secured to a portion of the sheet so that at least a portion of the cling material extends beyond the outer peripheral surface of the sheet of material.

48. The method of claim 45 further comprising a plurality of cling materials each cling material having a portion connected to a portion of the sheet of material.

49. The method of claim 48 wherein one of the cling materials is secured to at least a portion of the first side of the sheet of material and one other cling material is secured to at least a portion of the second side of the sheet of material.

50. The method of claim 48 wherein one of the cling materials is secured to at least a portion of the second side of the sheet of material and one other cling material is secured to at least a portion of the third side of the sheet of material.

51. The method of claim 48 wherein one of the cling materials is secured to at least a portion of the third side of the sheet of material and one other cling material is secured to at least a portion of the fourth side of the sheet of material.

52. The method of claim 48 wherein one of the cling materials is secured to at least a portion of the first side of the sheet of material, one other cling material is secured to at least a portion of the second side of the sheet of material, one other cling material is secured to at least a portion of the third side and yet another cling material is secured to at least a portion of the fourth side of the sheet of material.

53. The method of claim 45 wherein the cling material comprises a thickness in a range of less than about 0.2 mils to about 10 mils.

54. The method of claim 45 wherein the cling material comprises a thickness in a range of less than about 0.6 mils to about 2 mils.

55. The method of claim 45 wherein the sheet of material comprises a thickness of a range of less than about 0.2 mils to about 10 mils.

56. The method of claim 45 wherein the sheet of material comprises a thickness in a range of less than about 0.5 mils to about 2.5 mils.

* * * * *

UNITED STATES PATENT AND TRADEMARK OFFICE
CERTIFICATE OF CORRECTION

PATENT NO. : 5,007,229
DATED : April 16, 1991
INVENTOR(S) : Weder et al.

It is certified that error appears in the above-identified patent and that said Letters Patent is hereby corrected as shown below:

Cover Page, under Related U.S. Application Data [63], line 3, after "4,897,031," please insert --which is a continuation of Ser. No. 004,275, Jan. 5, 1987, Pat. No. 4,773,182,--.

Cover Page, under Related U.S. Application Data [63], line 5, after "doned," please delete "which is a" and substitute therefore --and said application is also a--.

Cover Page, under Related U.S. Application Data [63], line 7, after "1986", please insert --, now abandoned--.

Column 1, under CROSS REFERENCE TO RELATED APPLICATIONS, line 8, please delete "Method and Apparatus For Covering Portions Of An Object With A Sheet Of Material Having A Pressure Sensitive Adhesive Coating Applied To At Least A Portion Of At Least One Surface Of The Sheet Of Material", and substitute therefore --Method For Wrapping An Object With A Material Having Pressure Sensitive Adhesive Thereon--.

Column 1, under CROSS REFERENCE TO RELATED APPLICATIONS, line 19, after "and", please insert --said application is also--.

UNITED STATES PATENT AND TRADEMARK OFFICE
CERTIFICATE OF CORRECTION

PATENT NO. : 5,007,229
DATED : April 16, 1991
INVENTOR(S) : Weder et al.

It is certified that error appears in the above-indentified patent and that said Letters Patent is hereby corrected as shown below:

Column 1, under CROSS REFERENCE TO RELATED APPLICATIONS, line 20, please delete "co-pending".

Signed and Sealed this

Fifth Day of September, 1995

Attest:

BRUCE LEHMAN

Attesting Officer         Commissioner of Patents and Trademarks